(12) United States Patent
Kobayashi et al.

(10) Patent No.: US 9,112,397 B2
(45) Date of Patent: Aug. 18, 2015

(54) INVERTER TERMINAL BOARD INSTALLED IN MOTOR CASE

(75) Inventors: Masaki Kobayashi, Makinohara (JP); Kenichi Okamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 13/254,877

(22) PCT Filed: Nov. 5, 2010

(86) PCT No.: PCT/JP2010/069757
§ 371 (c)(1),
(2), (4) Date: Sep. 6, 2011

(87) PCT Pub. No.: WO2011/055806
PCT Pub. Date: May 12, 2011

(65) Prior Publication Data
US 2011/0316373 A1 Dec. 29, 2011

(30) Foreign Application Priority Data
Nov. 6, 2009 (JP) .................................. 2009-255278

(51) Int. Cl.
*H02K 11/00* (2006.01)
*H02K 7/00* (2006.01)
*H01R 9/24* (2006.01)
(Continued)

(52) U.S. Cl.
CPC .............. *H02K 11/0073* (2013.01); *H01R 9/24* (2013.01); *H01R 13/521* (2013.01); *H02K 5/225* (2013.01); *H01R 11/12* (2013.01); *H02K 5/10* (2013.01)

(58) Field of Classification Search
CPC ................................ H02K 5/225; H02K 3/522
USPC ............................................................ 310/71
See application file for complete search history.

(56) References Cited

U.S. PATENT DOCUMENTS 3,601,520 A * 8/1971 Carasso ....................... 174/15.7
5,517,401 A   5/1996 Kinoshita et al.
(Continued)

FOREIGN PATENT DOCUMENTS

| CN | 101038995 A | 9/2007 |
| JP | 5-219607 A | 8/1993 |

(Continued)

OTHER PUBLICATIONS

Machine translation of JP2008130388, Shimizu et al., Jun. 2008.*
(Continued)

*Primary Examiner* — Terrance Kenerly
(74) *Attorney, Agent, or Firm* — Sughrue Mion, PLLC

(57) ABSTRACT

A vibration-resistant inverter terminal board capable of sufficiently exerting a sealing effect on vibration even in the case of great variations due to assembly tolerances of a motor and an inverter is provided.

In an inverter terminal board including an electric conductor 20 having an inverter side connecting terminal 20T connected to an inverter terminal of an inverter attached to a case of a motor, a motor side connecting terminal 20C for supplying power to a power receiving terminal of the motor, and a braided wire 20H for connecting the inverter side connecting terminal 20T to the motor side connecting terminal 20C, a flat plate-shaped long terminal is used as the motor side connecting terminal 20C and the entire periphery of the flat plate-shaped long terminal is covered with packing 30.

11 Claims, 10 Drawing Sheets

(51) Int. Cl.
  *H01R 13/52* (2006.01)
  *H02K 5/22* (2006.01)
  *H01R 11/12* (2006.01)
  *H02K 5/10* (2006.01)

(56) References Cited

U.S. PATENT DOCUMENTS

| | | | |
|---|---|---|---|
| 5,942,822 A * | 8/1999 | Iwata et al. | 310/71 |
| 7,503,799 B2 * | 3/2009 | Keith et al. | 439/417 |
| 7,923,637 B2 * | 4/2011 | Susai et al. | 174/84 R |
| 8,951,065 B2 * | 2/2015 | Tsuge et al. | 439/559 |
| 2003/0203674 A1 * | 10/2003 | Baker et al. | 439/582 |
| 2004/0195016 A1 | 10/2004 | Shimizu et al. | |
| 2006/0134973 A1 * | 6/2006 | Wang | 439/541.5 |
| 2007/0149049 A1 * | 6/2007 | Feick et al. | 439/595 |
| 2007/0218747 A1 * | 9/2007 | Takehara | 439/382 |
| 2008/0084129 A1 * | 4/2008 | Utsunomiya et al. | 310/71 |
| 2009/0267430 A1 * | 10/2009 | Imamura et al. | 310/71 |
| 2009/0291586 A1 | 11/2009 | Takehara | |
| 2012/0184123 A1 * | 7/2012 | Fukuda et al. | 439/271 |

FOREIGN PATENT DOCUMENTS

| | | |
|---|---|---|
| JP | 2004-312853 A | 11/2004 |
| JP | 2007-80692 A | 3/2007 |
| JP | 2007-127153 A | 5/2007 |
| JP | 2007-244025 A | 9/2007 |
| JP | 2007-280913 A | 10/2007 |
| JP | 2008-130388 A | 6/2008 |

OTHER PUBLICATIONS

Machine translation of JP2007280913, Takehara, Oct. 2007.*
International Search Report (PCT/ISA/210) dated Dec. 21, 2010, in International Application PCT/JP2010/069757.
Written Opinion (PCT/ISA/237) dated Dec. 21, 2010, in International Application PCT/JP2010/069757.
Communication dated Jan. 13, 2014 from the State Intellectual Property Office of P.R. China in a counterpart application No. 201080012876.8.
Office Action dated Jan. 13, 2015, issued by the State Intellectual Property Office of P.R. China in counterpart Chinese Application No. 201080012876.8.
Office Action, dated Jul. 2, 2014, issued by the State Intellectual Property Office of the People's Republic of China in counterpart Chinese Application No. 201080012876.8.

* cited by examiner (A)

(B)

(A)

(B)

INVERTER TERMINAL BOARD INSTALLED IN MOTOR CASE

TECHNICAL FIELD

The present invention relates to a suitable inverter terminal board unaffected by vibration under an environment of occurrence of the vibration in the case of installing an inverter used for a vehicle etc. in a motor case.

BACKGROUND ART

An electric vehicle or a hybrid electric vehicle generally includes a motor and an inverter between a battery and wheels in order to drive the wheels by electric power accumulated in the battery.

The electric power accumulated in the battery is converted by the inverter of an inverter device etc. and is supplied to the motor and rotates the motor, and rotation of the motor is transmitted to the wheels and drives the wheels.

Conventionally, the inverter and the motor were mounted in separate places of the vehicle and a terminal of the inverter was connected to a terminal of the motor using a wire harness.

On the other hand, a structure of integrating an inverter with a motor for the purpose of cost reduction and miniaturization of an electric driving system from a battery to wheels has been proposed recently (Patent Reference 1 or 2).

<Invention Described in Patent Reference 1 or 2>

FIG. 9 is a conceptual diagram of an invention of integrating an inverter with a motor described in Patent Reference 1 or 2, and a power receiving box 100C is placed on a motor case 100 for accommodating a three-phase AC motor (an induction motor or a synchronous machine) and three motor side terminals 100T for receiving three-phase AC electric power are attached to the power receiving box 100C and on the other hand, output terminals 200T of an inverter 200 for receiving a DC from a DC power source placed on the other part of a vehicle and converting the DC into an three-phase AC are attached. Then, a vibration-resistant terminal board targeted for the invention is used for supplying the three-phase AC electric power of the inverter 200 from the output terminals 200T to the motor side terminals 100T of the power receiving box 100C of the side of the motor case 100.

<Merit of Invention Described in Patent Reference 1 or 2>

After the motor case 100 and the inverter 200 are assembled separately, the inverter 200 is installed in the vicinity of the motor case 100 and also the output terminals 200T of the inverter 200 are connected to the motor side terminals 100T of the motor case 100 by the terminal board and thereby, the inverter 200 and the motor case 100 can be assembled and manufactured as separate modules and are only connected by the terminal board at the time of integration, so that manufacture is easy and cost can be reduced.

<Demerit of Invention Described in Patent Reference 1 or 2>

However, in such a configuration, a vibration phase difference between the inverter and the motor by vibration of the motor itself or vibration of a vehicle body at the time of driving is applied to a connector and the connector may be damaged. Therefore, it is necessary to develop a connector capable of withstanding such vibration.

Then, a connector described in Patent Reference 3 is disclosed as the connector capable of withstanding such vibration.

PRIOR ART REFERENCE

Patent Reference

Patent Reference 1: JP-A-5-219607
Patent Reference 2: JP-A-2004-312853
Patent Reference 3: JP-A-2007-280913

<Configuration of Connector Described in Patent Reference 3>

The connector described in Patent Reference 3 is characterized in that in the connector for connecting an inverter terminal to a motor terminal, an inverter cabinet and the inverter terminal and a motor cabinet and the motor terminal are included and while the motor terminal is fixed and attached to the motor cabinet, the inverter terminal is attached to the inverter cabinet through a vibration absorber.

<Merit of Connector Described in Patent Reference 3>

Since the terminal of one device is attached to the cabinet of its device through the vibration absorber thus, even when vibration by a phase difference is applied to one device and the other device, its vibration is absorbed by the vibration absorber, so that an extra load is not applied to a connector connection and adverse influences of damage etc. can be prevented.

DISCLOSURE OF THE INVENTION

Problems that the Invention is to Solve

<Problem of Connector Described in Patent Reference 3>

However, the connector described in Patent Reference 3 has a problem that a mechanical connection of the connector is susceptible to vibration since a motor side connecting terminal is connected to an inverter side terminal by the connector.

Also, waterproof properties at the time of absorption in the case of variations due to assembly tolerances of a motor and an inverter are insufficient and there is no structure of preventing an oil leak from the motor.

Therefore, even when the vibration absorber is included, vibration of the connection cannot be eliminated completely and the mechanical connection of the connector may cause bad connection due to the long-term vibration.

Also, when vibration varies greatly in the case of great variations due to the assembly tolerances of the motor and the inverter, the mechanical connection of the connector cannot prevent the vibration sufficiently and even when packing is received in the inside, its packing does not function effectively and there is fear that water immersion or an oil leak cannot be prevented.

OBJECT OF THE INVENTION

The invention has been implemented in order to solve the problem described above, and an object of the invention is to provide an inverter terminal board capable of being made resistant to vibration by stopping connection between a motor side connecting terminal and an inverter side terminal by a connector and sufficiently performing waterproof and oil-proof functions and sufficiently exerting a sealing effect on vibration even in the case of great variations due to assembly tolerances of a motor and an inverter.

Means for Solving the Problems

In order to solve the problem described above, a first invention of the present application is an inverter terminal board including an electric conductor which has an inverter side connecting terminal connected to an output terminal of an inverter attached to a motor case and a motor side connecting terminal connected to a power receiving terminal of the motor and is made by connecting the inverter side connecting terminal to the motor side connecting terminal by a braided wire, wherein a flat plate-shaped long terminal is used as the motor side connecting terminal and the middle of the flat plate-shaped long terminal is covered with packing.

Also, in the first invention, a second invention is wherein in the packing, two or more chevron parts are formed in longitudinal sectional view.

Also, in the first invention, a third invention is wherein in that both ends of the packing attached to the motor side connecting terminal are provided with spacers.

Advantage of the Invention

According to the first invention as described above, a connector connection is eliminated, and connection between the motor side connecting terminal of the inverter terminal board and the power receiving terminal of the motor and connection between the inverter side connecting terminal and the output terminal of the inverter are coupled by bolts and the motor side connecting terminal is connected to the inverter side connecting terminal by the braided wire, so that the vibration-resistant inverter terminal board can be obtained and even in the case of great variations due to assembly tolerances of the motor and the inverter, the packing with which the entire periphery of the flat plate-shaped long terminal is covered can sufficiently exert a sealing effect on vibration and the braided wire can conform with a weakness (susceptibility to displacement) by using the packing, so that the inverter terminal board in which a load is not applied to the terminal can be obtained.

According to the second invention, the packing has elasticity by the two chevron parts and can obtain a long stroke of deformation and can also fit stably. The packing capable of sufficiently exerting the sealing effect on vibration can be obtained.

According to the third invention, even at the time of large vibration, the motor side connecting terminal can maintain a vertical state, so that the sealing effect on the vibration can be exerted sufficiently.

BRIEF DESCRIPTION OF THE DRAWINGS

Both FIGS. 1(A) and 1(B) construct an exploded perspective view of an inverter terminal board to which the invention is applied.

FIG. 5(A) shows a state of the packing at the time of no vibration, and FIG. 5(B) shows a state of the packing at the time when a motor side connecting terminal is displaced by vibration while maintaining a vertical state, and FIG. 5(C) represents a deformed state of the packing at the time when the motor side connecting terminal is inclined by vibration. In addition, FIG. 5(A) shows the original shape of the normal packing by representing lip parts of the packing in a state in which an external force is not applied to an inner peripheral surface of the inverter terminal board intentionally by dotted lines. That is, note that use of the dotted lines in the lip parts of the packing does not indicate that the packing bites into the inverter terminal board.

FIG. 8(A) shows a state of the packing at the time of no vibration, and FIG. 8(B) represents a deformed state of the packing at the time of vibration. In addition, FIG. 8(A) shows the original shape of the normal packing by representing lip parts of the packing in a state in which an external force is not applied to an inner peripheral surface of the inverter terminal board intentionally by dotted lines. That is, note that use of the dotted lines in the lip parts of the packing does not indicate that the packing bites into the inverter terminal board.

MODE FOR CARRYING OUT THE INVENTION

First and second embodiments of vibration-resistant packing of the invention capable of sufficiently exerting a sealing effect on vibration even in the case of great variations due to assembly tolerances of a motor and an inverter will hereinafter be described based on the drawings.
(First Embodiment)
<Inverter Terminal Board According to Prior Invention Serving as Basis for the Invention>
A prior invention serving as a basis for producing the invention will be described before describing the invention.

Figure 10:
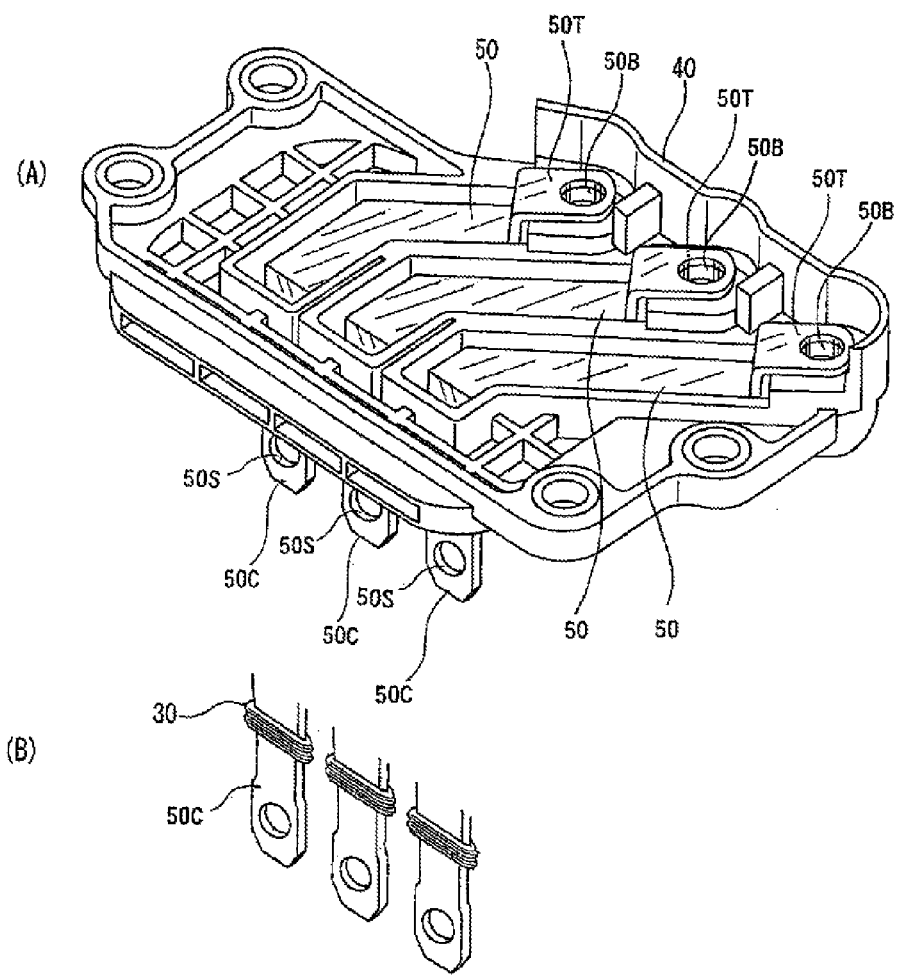
FIG. 10(A) is a perspective view of an inverter terminal board according to a prior invention serving as a basis for the invention and FIG. 10(B) is a perspective view of each of the motor side connecting terminals.

FIGS. 10(A) and 10(B) are views describing an inverter terminal board according to the prior invention, and FIG. 10(A) is the whole perspective view, and FIG. 10(B) is a perspective view of motor side connecting terminals 50C. In FIG. 10(A), an inverter terminal board 40 is a container made by resin molding, and accommodates three bus bars 50 in the inside with the bus bars juxtaposed.

Figure 9:
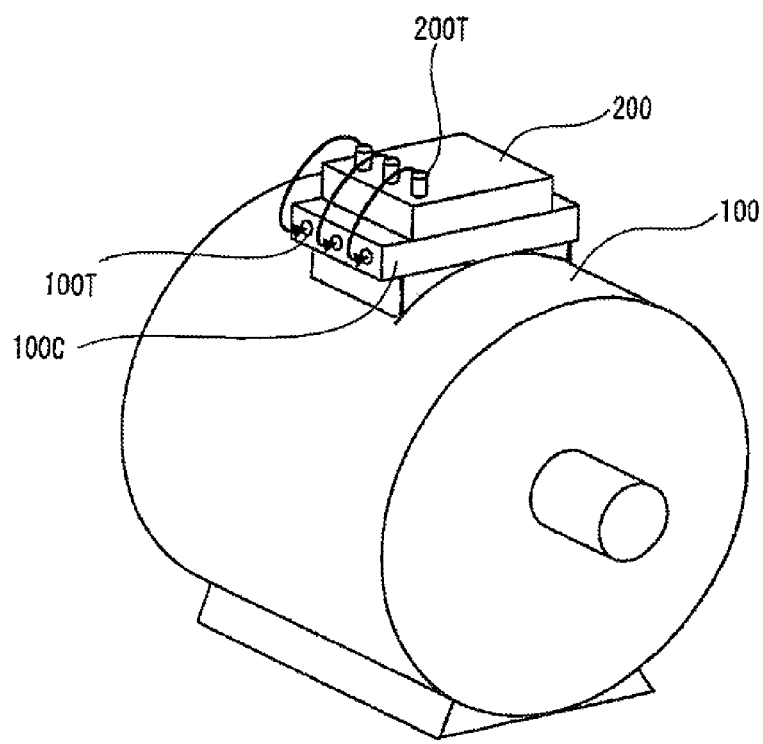
FIG. 9 is a conceptual diagram of an invention of integrating an inverter with a motor described in Patent Reference 1 or 2.

Each of the bolt through holes 50B is bored in each of the inverter side connecting terminals 50T of the three bus bars 50, and each of the motor side connecting terminals 50C of the opposite side bends and extends vertically downward from a horizontally juxtaposed state inside the inverter terminal board 40, and the top of each of the motor side connecting terminals 50C is exposed from the inverter terminal board 40 and a bolt through hole 50S is bored. The output terminal 200T of the inverter 200 (FIG. 9) is inserted into the bolt through hole 50B and is tightened with a nut. A bolt is inserted into the bolt through hole 50S and is tightened on the motor side terminal 100T (FIG. 9) of the power receiving box 100C (FIG. 9) of the side of the motor case 100 (FIG. 9). Packing 30 for, for example, preventing an oil leak from a motor is attached to the motor side connecting terminal 50C.

<Merit of Inverter Terminal Board Shown in FIGS. 10(A) and 10(B)>

Since the inverter side terminal 50T and the motor side connecting terminal 50C are formed in both ends of one bus bar 50, connection by a connector is eliminated and the vibration-resistant inverter terminal board is obtained.

Also, since there is no connection by the connector, variations in a mechanical connection do not occur and the packing 30 sufficiently exerts a sealing effect on vibration and the inverter terminal board with good waterproof and oilproof properties is obtained.

<Problem Point of Inverter Terminal Board Shown in FIGS. 10(A) and 10(B)>

Since the packing 30 is made of rubber, the motor side connecting terminal 50C may move and in that case, the bus bar 50 cannot absorb the variations since the bus bar 50 with high rigidity cannot follow its movement, so that there is a problem point in which a load is applied to other portions of the inverter terminal board.

<Inverter Terminal Board to which the Invention is Applied>

Figure 1:
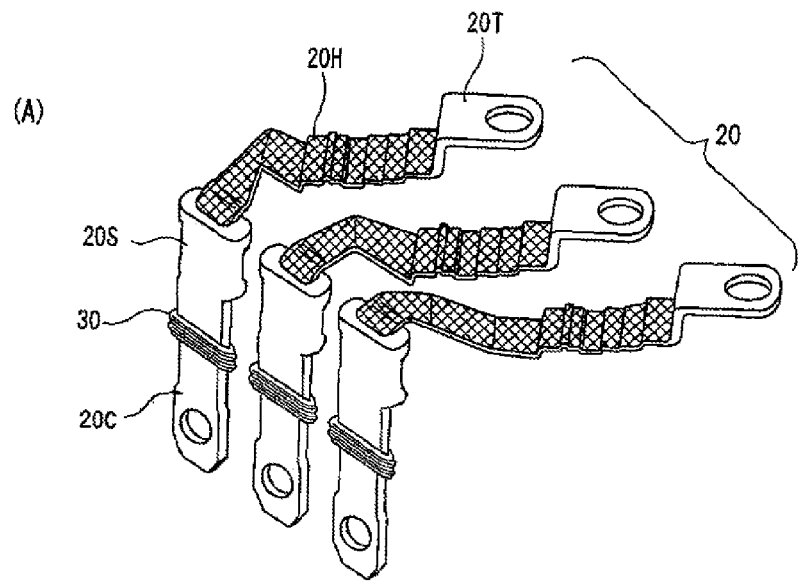
FIG. 1(A) shows an assembly of a braided wire and connecting terminals in the case of using the braided wire in an electric conductor of the inverter side and FIG. 1(B) shows the inverter terminal board for receiving the assembly of FIG. 1(A).
Figure 1:
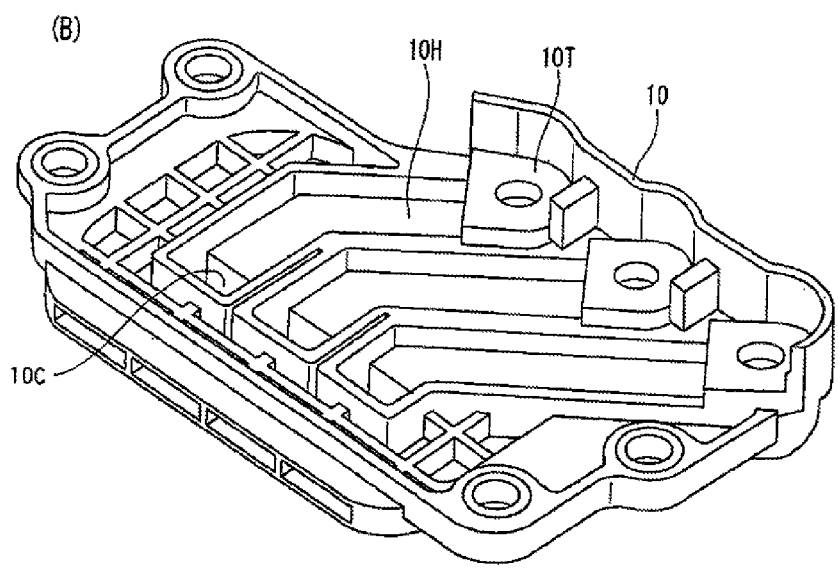

FIGS. 1(A) and 1(B) are exploded perspective views of an inverter terminal board according to the invention for further solving the problem described above while maintaining the merit of the inverter terminal board of FIGS. 10(A) and 10(B). FIG. 1(A) is a perspective view of three assemblies of connecting terminals and braided wires used as electric conductors of the inverter side, and FIG. 1(B) is a perspective view of the inverter terminal board for receiving the three braided wires of FIG. 1(A) in a juxtaposed state.

In FIG. 1(A), electric conductors 20 are the electric conductors of three systems for supplying an AC three-phase current produced in the inverter side to the motor side, and each of the electric conductors includes an inverter side connecting terminal 20T, a braided wire 20H whose one end is connected to the inverter side connecting terminal 20T, and a motor side connecting terminal 20C having a caulked part 20S in which the other end of the braided wire 20H is caulked.

Since the flexible braided wire 20H is interposed between the inverter side connecting terminal 20T and the motor side connecting terminal 20C by the first embodiment of the invention, unlike intervention of the bus bar with high rigidity, vibration applied to the inverter side connecting terminal 20T is absorbed by the braided wire 20H and is not transmitted to the motor side connecting terminal 20C.

Also, packing 30 is attached to the motor side connecting terminal 20C so as to surround the motor side connecting terminal 20C.

In FIG. 1(B), an inverter terminal board 10 is a container in which the whole for respectively receiving the electric conductors 20 of three systems is molded of synthetic resin, and is provided with terminal receiving parts 10T for respectively receiving the inverter side connecting terminals 20T of the electric conductors 20 of three systems, braided wire receiving parts 10H for respectively receiving the braided wires 20H of three systems, and motor side connecting terminal insertion ports 10C (not seen in the drawing) into which the motor side connecting terminals 20C are inserted.

Figure 2:
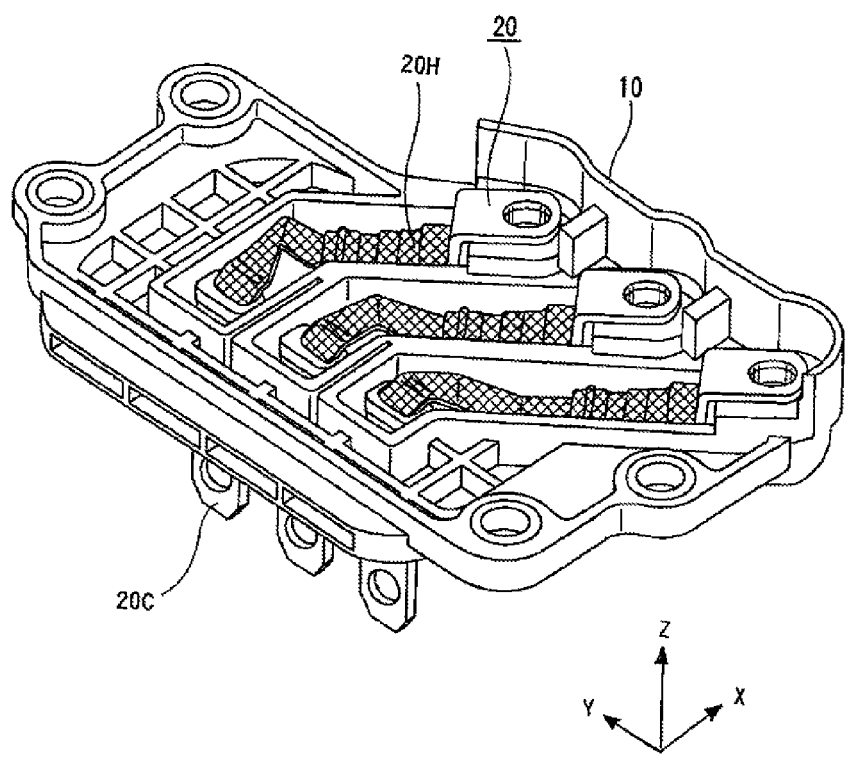
FIG. 2 is a perspective view showing a state of receiving the assembly of FIG. 1(A) in the inverter terminal board of FIG. 1(B).

FIG. 2 is a perspective view of a state of receiving the braided wires 20H of three systems in the inverter terminal board 10 of FIG. 1(B). In FIG. 2, the inverter side connecting terminal 20T (FIG. 1(A)) of the electric conductor 20 is placed on the terminal receiving part 10T (FIG. 1(B)) and the braided wire 20H is placed on the braided wire receiving part 10H (FIG. 1(B)) and then, the motor side connecting terminal 20C inserted into the motor side connecting terminal insertion port 10C (FIG. 1(B)) protrudes from a lower portion of the inverter terminal board 10. This motor side connecting terminal 20C is attached to the motor side terminal 100T (FIG. 9) of the power receiving box 100C of the other motor case 100 (FIG. 9) with a bolt.

Figure 3:
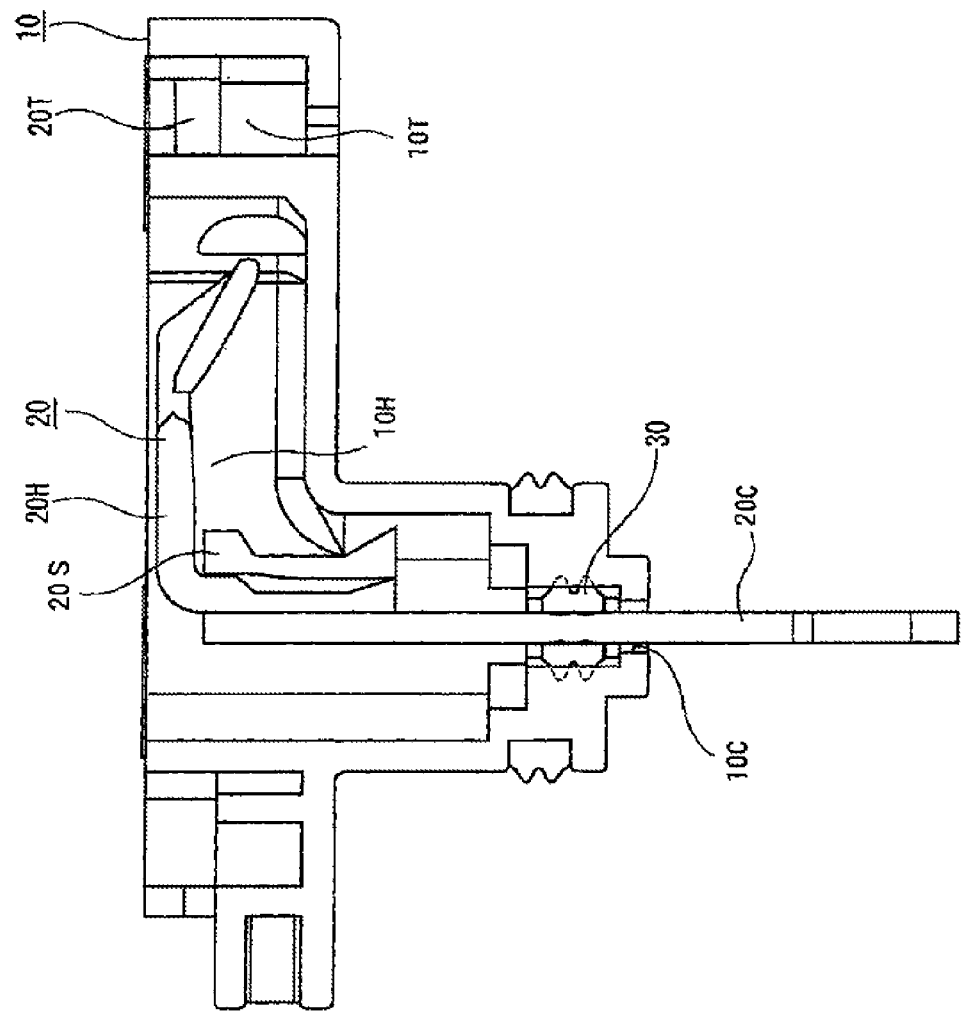
FIG. 3 is a longitudinal sectional view showing the state of FIG. 2.

FIG. 3 is a longitudinal sectional view showing the state of FIG. 2 in which the braided wire 20H is attached to the inverter terminal board 10. In FIG. 3, the braided wire 20H attached to the inverter terminal board 10 is placed on the braided wire receiving part 10H and the end of the braided wire 20H is caulked in the caulked part 20S of the motor side connecting terminal 20C. The top of the other end of the motor side connecting terminal 20C downward protrudes from the inverter terminal board 10 (see FIG. 2).

<Shape of Packing 30>

The packing 30 of FIG. 3 is the packing for preventing, for example, an oil leak from the motor, and the packing having two chevron parts (lip parts) over the entire periphery is used, and the packing capable of stably making contact with the other contact surface is formed. By contraction and expansion of the two chevron parts, the packing 30 can obtain a long stroke of deformation. In addition, the two chevron parts are formed herein, but for a large installation area, three or more chevron parts can be formed.

<Function of Packing 30>

Figure 4:
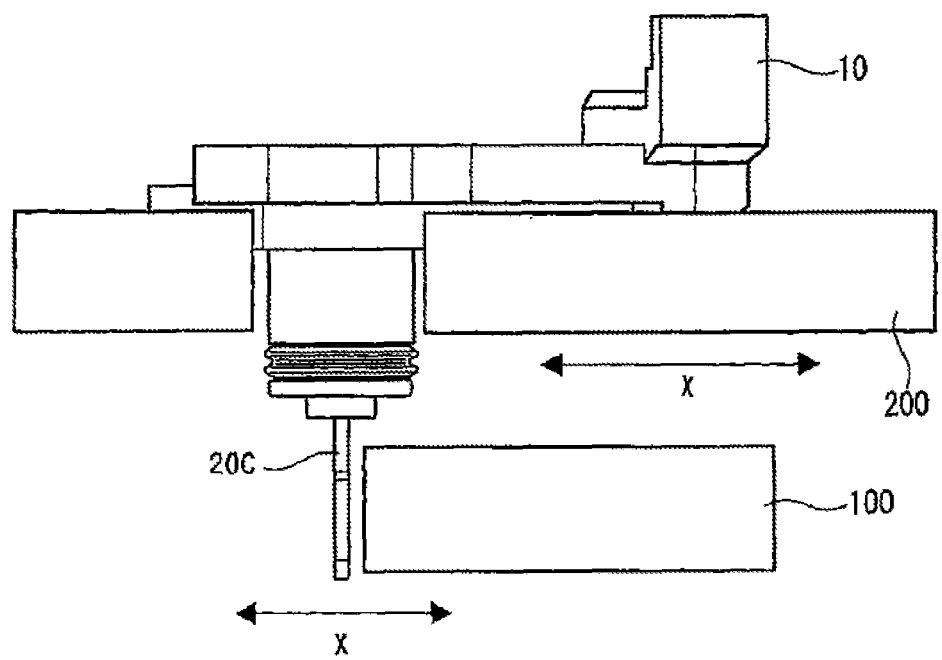
FIG. 4 is a conceptual diagram describing vibration in a state of placing an inverter having the inverter terminal board on a motor case.

FIG. 4 is a conceptual diagram showing a state of placing the inverter terminal board 10 of the inverter 200 on the motor case 100, and a thin surface of the motor side connecting terminal 20C (FIG. 1(A)) with a thin rectangular flat plate shape is set at the front side. When magnitude of vibration applied to the inverter or the motor is shown by the X, Y and Z axes (see FIG. 2) of three dimensions, an amplitude of an X direction is large while amplitudes of Y and Z directions are small, so that by the two chevron parts present on the entire periphery of the packing 30, vibration of the X direction is applied to the inverter or the motor and the phase difference occurs between the inverter and the motor and even when relative movement occurs between the inverter and the motor, waterproof and oilproof functions can be performed sufficiently by providing the motor side connecting terminal 20C with the packing 30.

(Second Embodiment)

<Problem of First Embodiment>

As described above, a packing function is effectively fulfilled with respect to vibration by using the packing 30, but the subsequent experiment revealed that a packing leak occurs under specific conditions. The cause will be described using FIGS. 5(A) to 5(C).

Figure 5:
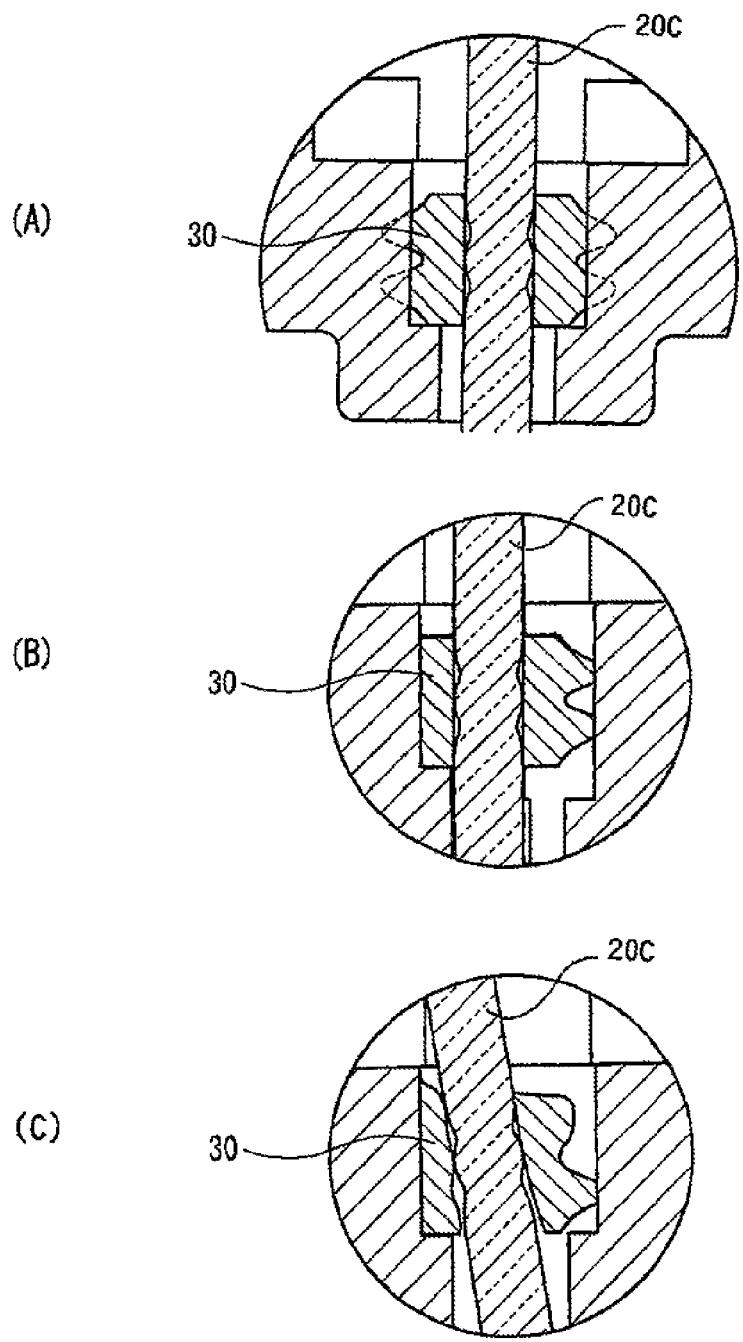
FIGS. 5(A) to 5(C) are sectional views describing a function of packing.

FIGS. 5(A) to 5(C) are sectional views describing the function of the packing 30, and FIG. 5(A) shows a state of the packing 30 at the time of no vibration, and FIG. 5(B) shows a state of the packing 30 at the time when the motor side connecting terminal 20C is displaced by vibration while maintaining a vertical state, and FIG. 5(C) represents a deformed state of each packing 30 at the time when the motor side connecting terminal 20C is inclined by vibration.

At the time of no vibration of FIG. 5(A), the packing 30 is in contact with a contact surface of the entire periphery, so that the packing function is fulfilled without any problem.

At the time of vibration of FIG. 5(B), the motor side connecting terminal 20C is displaced while maintaining the vertical state, so that the packing 30 is in contact with the contact surface of the entire periphery as can be seen from the drawing, with the result that the packing function is similarly fulfilled without any problem.

However, when the motor side connecting terminal 20C is inclined at the time of vibration as shown FIG. 5(C), a portion of the chevron part is separated from the contact surface in the packing 30, so that it was revealed that the packing function cannot be effectively fulfilled even for the packing 30 of the first embodiment.

(Second Embodiment)

A second embodiment has been implemented in order to solve such a problem of the first embodiment, and is constructed so as to provide both upper and lower ends of packing with spacers by noticing that the motor side connecting terminal 20C could be prevented from being inclined as shown FIG. 5(C) even for vibration.

<Spacer of Second Embodiment>

Figure 6:
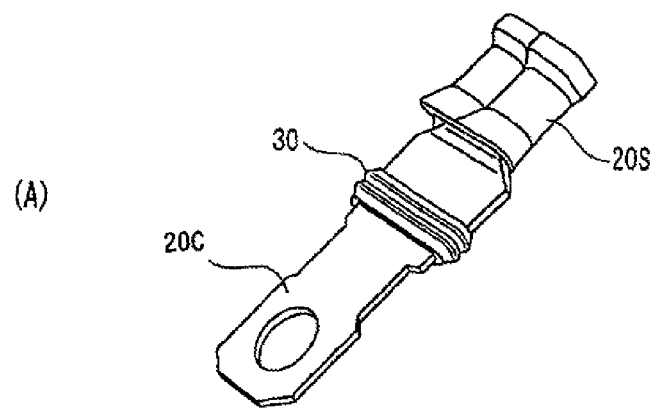
FIG. 6(A) is a perspective view seen from the back side of the motor side connecting terminal representing the packing of a first embodiment.
FIG. 6(B) is a perspective view seen from the back side of the motor side connecting terminal representing the packing of the first embodiment and an upper spacer and a lower spacer with which both ends of the packing are provided.
Figure 6:
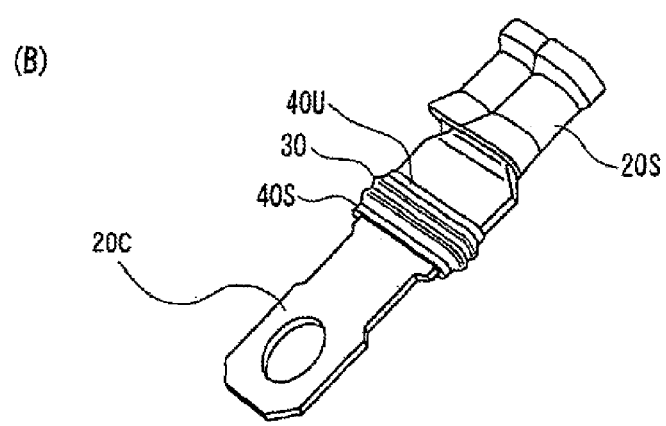

FIG. 6(A) is a perspective view seen from the back side of the motor side connecting terminal 20C representing the packing 30 of the first embodiment, and FIG. 6(B) is a perspective view seen from the back side of the motor side connecting terminal 20C representing the packing 30 of the first embodiment and an upper spacer 40U and a lower spacer 40S with which both ends of the packing 30 are provided. Both of the upper spacer 40U and the lower spacer 40S have the same shape made of the same material, and have an oval shape in plan view and have the shape in which a hole through which the motor side connecting terminal 20C extends is bored in the center.

<Function of Spacer of Second Embodiment>

Figure 7:
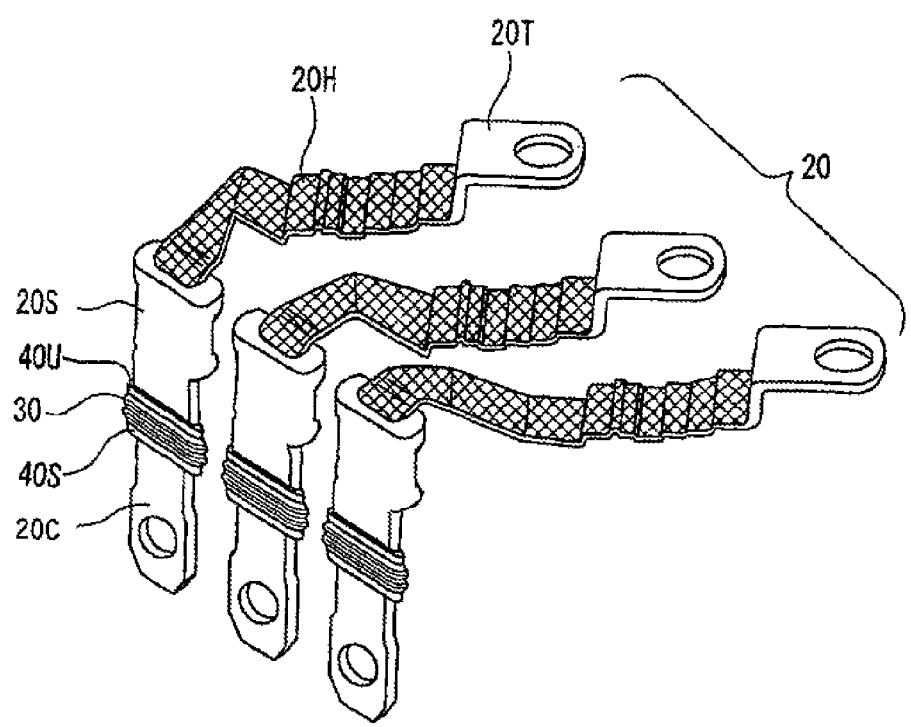
FIG. 7 is a perspective view of an assembly in which the upper spacer and the lower spacer are attached to both upper and lower ends of each packing of the assembly of FIG. 1(A).

FIG. 7 is a perspective view of an electric conductor of the inverter side in which the upper spacer 40U and the lower spacer 40S are attached to both upper and lower ends of each packing 30 (FIG. 1(A)) of the first embodiment.

In FIG. 7, electric conductors 20 are the electric conductors of three systems for supplying an AC three-phase current produced in the inverter side to the motor side, and each of the electric conductors includes an inverter side connecting terminal 20T, a braided wire 20H whose one end is connected to the inverter side connecting terminal 20T, and a motor side connecting terminal 20C having a caulked part 20S in which the other end of the braided wire 20H is caulked. Then, the packing 30 according to the first embodiment of the invention for surrounding the motor side connecting terminal 20C and the upper spacer 40U and the lower spacer 40S according to the second embodiment are attached to the motor side connecting terminal 20C.

Figure 8:
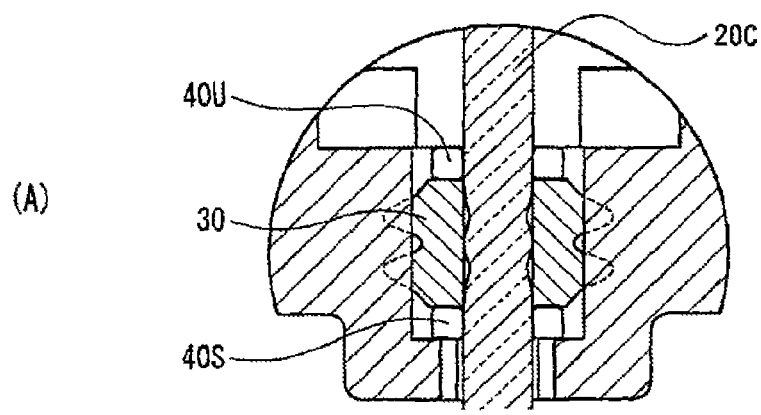
FIGS. 8(A) and 8(B) are sectional views describing a function of the upper and lower spacers of FIG. 7.
Figure 8:
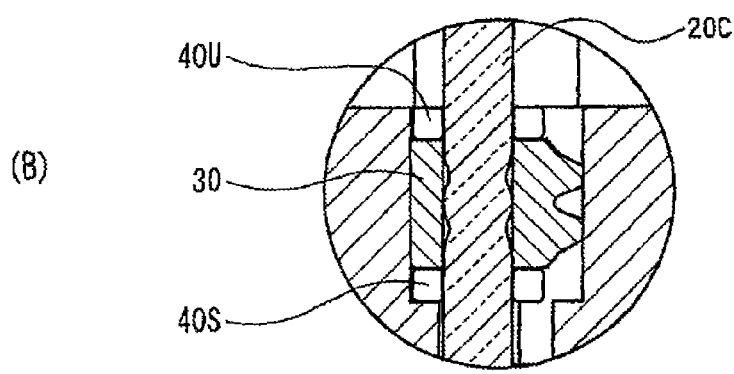

FIGS. 8(A) and 8(B) are sectional views describing a function of such upper and lower spacers 40U, 40S, and FIG. 8(A) shows a state of the packing 30 at the time of no vibration, and FIG. 8(B) represents a deformed state of each packing 30 at the time of vibration.

At the time of no vibration of FIG. 8(A), the packing 30 is in contact with a contact surface of the entire periphery, so that the packing function is fulfilled without any problem. At the time of vibration of FIG. 8(B), even when the motor side connecting terminal 20C attempts to be displaced and inclined in the hole, upper and lower portions of the motor side connecting terminal 20C are regulated by the upper and lower spacers 40U, 40S, so that the motor side connecting terminal 20C is forced to be displaced while maintaining the vertical state and therefore, the packing 30 is in contact with the contact surface of the entire periphery as shown in the drawing and the motor side connecting terminal 20C is not inclined as shown FIG. 5(C), so that the packing function can be fulfilled without any problem.

<Sub-Function of Spacer of Second Embodiment>

When only the packing 30 is attached to the motor side connecting terminal 20C without the upper and lower spacers 40U, 40S, the packing 30 turns, so that workability is remarkably bad, but the upper and lower spacers 40U, 40S also play the role of a guide in the case of attaching the packing 30 to the motor side connecting terminal 20C by sandwiching the packing 30 between the upper and lower spacers 40U, 40S, so that workability improves remarkably.

<Effect of Upper and Lower Spacers 40U, 40S of Second Embodiment>

By providing both ends of the packing 30 with the upper and lower spacers 40U, 40S of the second embodiment of the invention, the motor side connecting terminal 20C is displaced while maintaining the vertical state by the upper and lower spacers 40U, 40S even when large relative movement occurs between the inverter and the motor and the motor side connecting terminal 20C attempts to be inclined, so that the second embodiment can obtain an effect in which the packing 30 of the first embodiment can continue to fulfill the packing function without any problem.

The present application is based on Japanese patent application (patent application No. 2009-255278) filed on Nov. 6, 2009, and the contents of the patent application are hereby incorporated by reference.

DESCRIPTION OF REFERENCE NUMERALS AND SIGNS

10 INVERTER TERMINAL BOARD
10C MOTOR SIDE CONNECTING TERMINAL INSERTION PORT
10H BRAIDED WIRE RECEIVING PART
10T TERMINAL RECEIVING PART
20 ELECTRIC CONDUCTOR
20C MOTOR SIDE CONNECTING TERMINAL
20H BRAIDED WIRE
20S CAULKED PART
20T INVERTER SIDE CONNECTING TERMINAL
30 PACKING
40S LOWER SPACER
40U UPPER SPACER
100 MOTOR CASE
100C POWER RECEIVING BOX
100T MOTOR SIDE TERMINAL
200 INVERTER
200T OUTPUT TERMINAL

The invention claimed is:

1. An inverter terminal board, comprising:
an electric conductor which has an inverter side connecting terminal tightened to an output terminal of an inverter attached to a motor case, and a motor side connecting terminal tightened to a power receiving terminal of the motor case, the electric conductor being made by connecting the inverter side connecting terminal to the motor side connecting terminal by a braided wire,
wherein a flat plate-shaped long terminal is used as the motor side connecting terminal and the middle of the flat plate-shaped long terminal is grooved and covered with packing,
wherein the flat plate-shaped long terminal includes a hole configured to receive a fastener for tightening the flat plate-shaped long terminal to the power receiving terminal, and wherein the packing is between the hole of the flat plate-shaped long terminal and the braided wire.

2. The inverter terminal board as claimed in claim 1, wherein in the packing, two or more chevron parts are formed in longitudinal sectional view.

3. The inverter terminal board as claimed in claim 1, wherein both ends of the packing attached to the motor side connecting terminal are provided with spacers.

4. The apparatus as claimed in claim 1, wherein the packing directly contacts the flat plate-shaped long terminal.

5. The apparatus as claimed in claim 1, wherein the packing directly contacts the middle of the flat plate-shaped long terminal that is grooved.

6. The apparatus as claimed in claim 1, wherein the flat plate-shaped long terminal is one contiguous terminal.

7. An apparatus comprising:
an electric conductor including:
a first terminal configured to be tightened to a terminal of a first apparatus;
a second terminal configured to be tightened to a terminal of a second apparatus; and
a braided wire that electrically connects the first terminal to the second terminal;
a packing that is disposed over a grooved portion of the first terminal;
a first spacer disposed over a first distal end of the packing; and
a second spacer disposer below a second distal end of the packing,
wherein the first terminal includes a hole configured to receive a fastener for tightening the first terminal to the terminal of the first apparatus, and
wherein the packing is between the hole of the first terminal and the braided wire.

8. A system including:
a motor case including a terminal;
an inverter including a terminal that is attached to the motor case; and
an apparatus including:
an electric conductor including:
a first terminal configured to be tightened to the terminal of the motor case;
a second terminal configured to be tightened to the terminal of the inverter; and
a braided wire that electrically connects the first terminal to the second terminal; and
a packing that is disposed over a grooved portion of the first terminal,
wherein the first terminal includes a hole configured to receive a fastener for tightening the first terminal to the terminal of the motor case, and
wherein the packing is between the hole of the first terminal and the braided wire.

9. The system as claimed in claim 8, wherein the first terminal is one contiguous terminal.

10. An inverter terminal board, comprising:
a braided wire configured to form an electrical connection between a motor and an inverter;
a first terminal directly connected to a first end of the braided wire and configured to form an electrical connection with the motor;
a packing that contacts a portion of the first terminal; and
a second terminal directly connected to a second end of the braided wire and configured to form an electrical connection with the inverter, wherein
the braided wire longitudinally extends in a first direction, and
the first terminal longitudinally extends in a second direction that is orthogonal to the first direction,
the first terminal includes hole configured to receive a fastener for tightening the first terminal to a terminal of the motor, and
the packing is between the hole of the first terminal and the braided wire.

11. The inverter terminal board according to claim 10, wherein the first terminal is one contiguous terminal.

* * * * *